(12) United States Patent
Wooters (10) Patent No.: US 8,605,885 B1
(45) Date of Patent: Dec. 10, 2013

(54) AUTOMATED ASSISTANT FOR CUSTOMER SERVICE REPRESENTATIVES

(75) Inventor: Charles C. Wooters, Annapolis, MD (US)

(73) Assignee: Next IT Corporation, Spokane, WA (US)

(*) Notice: Subject to any disclaimer, the term of this patent is extended or adjusted under 35 U.S.C. 154(b) by 189 days.

(21) Appl. No.: 12/604,674

(22) Filed: Oct. 23, 2009

Related U.S. Application Data (60) Provisional application No. 61/107,825, filed on Oct. 23, 2008.

(51) Int. Cl.
*H04M 3/00* (2006.01)
*G10L 15/00* (2013.01)

(52) U.S. Cl.
USPC .................................. 379/265.02; 704/255

(58) Field of Classification Search
USPC ............... 379/88.01–88.25, 265.02, 201.04; 704/7, 255; 709/224; 455/411
See application file for complete search history.

(56) References Cited

U.S. PATENT DOCUMENTS

| | | | |
|---|---|---|---|
| 6,016,336 A * | 1/2000 | Hanson | 379/88.23 |
| 6,061,433 A * | 5/2000 | Polcyn et al. | 379/93.12 |
| 6,269,336 B1 | 7/2001 | Ladd et al. | |
| 7,058,565 B2 | 6/2006 | Gusler et al. | |
| 7,191,133 B1 | 3/2007 | Pettay | |
| 7,346,152 B2 * | 3/2008 | Paden et al. | 379/88.16 |
| 7,460,650 B2 | 12/2008 | Bushey et al. | |
| 7,660,233 B2 * | 2/2010 | Paden et al. | 370/216 |
| 2003/0154184 A1 * | 8/2003 | Chee et al. | 707/1 |
| 2003/0179876 A1 * | 9/2003 | Fox et al. | 379/265.02 |
| 2003/0197590 A1 * | 10/2003 | Wang et al. | 340/3.54 |
| 2003/0204394 A1 * | 10/2003 | Garudadri et al. | 704/201 |
| 2006/0072727 A1 | 4/2006 | Bantz et al. | |
| 2006/0085538 A1 * | 4/2006 | Newman et al. | 709/224 |
| 2006/0259302 A1 | 11/2006 | Lewis et al. | |

* cited by examiner

*Primary Examiner* — Mohammad Islam
(74) *Attorney, Agent, or Firm* — Lee & Hayes, PLLC

(57) ABSTRACT

Systems and methods for handling information communicated by voice. The method may comprise: (i) receiving a call from a caller, the call comprising utterances from the caller; (ii) verbally communicating information to the caller through a customer service representative, the agent interacting with a display; (iii) processing the utterances with a computing device; (iv) determining content of the utterances; and (v) displaying information on the display based on the content.

21 Claims, 5 Drawing Sheets

AUTOMATED ASSISTANT FOR CUSTOMER SERVICE REPRESENTATIVES

CROSS-REFERENCE TO RELATED APPLICATION

This application claims priority to U.S. provisional application Ser. No. 61/107,825, filed Oct. 23, 2008, which is hereby incorporated by reference in its entirety.

BACKGROUND

In the modern world, goods or services may be offered through or supported by a telecommunications-based network of call centers that can receive and handle calls from various customers. Such call centers often comprise a combination of human (e.g., customer service representatives) and machine resources that are intended to serve and be responsive to the needs or desires of the customers. Typically, the customer service representatives have varying levels of expertise on particular products and/or services, interpersonal skills, company policies, or any of a number of other areas. Additionally, the customer service representative typically must use a wide array of software applications and programs to access pertinent data. An important objective of a call center network is to provide each customer who calls in with the highest quality of service within the shortest amount of time by the most qualified customer service representative available who has at his or her disposal the appropriate information for a particular customer call.

An incoming call can be received initially by any one of the agents or customer service representatives staffed at the call centers. These customer service representatives, however, might not be able to adequately and/or efficiently handle the needs of the caller. For example, the customer service representatives may not have the skill set, training, understanding of the goods/services, or understanding of the customer service representative user interface to perform the needed tasks accurately and efficiently. In some cases, the customer service representative might need to transfer the caller to a second customer service representative who can properly handle the requests of the caller. At a minimum, the transfer requires an incoming line supporting the call into the receiving call center, an outgoing line from the first customer service representative, and an incoming line into the second customer service representative or call center to which the call was transferred. Transferring a call also might add to the total length of the call for the caller, which could be undesirable. In other cases, if the customer service representative does not transfer the caller, the customer service representative might spend an excessive amount of time to address the issue of the caller. This time may be spent by the customer service representative maneuvering through the multiple screens and programs of the customer service representative user interface to locate the proper information for the caller.

Consequently, in order to provide quality service to customers, it is important to have a customer service representative who is knowledgeable of the goods and services supported by the call center and who can access relevant information with the customer service representative user interface quickly and efficiently. In some instances, it is also important for the customer service representative to recommend promotions or products that may be of interest to the particular caller. The ability to efficiently recommend these promotions or products may require additional training or supervision. Ultimately, in order for a customer service representative to be proficient, the customer service representative typically must be trained and supervised by a supervisor or manager during customer calls. In some cases, a supervisor may "listen in" to the calls to aid in the training. Such training and supervision requires resources and expenses.

Speech recognition systems have previously been developed to process and recognize human speech, and may also take action or carry out further processes. Developments in speech recognition technologies support "natural language" type interactions between automated systems and users. A natural language interaction allows a person to speak naturally. Voice recognition systems can react responsively to a spoken request. Speech recognition technologies typically have been implemented with customer call centers in the area of automatic call routing ("ACR"). A goal of an ACR application is to replace the customer service representative or to lessen the role of a customer service representative during a call. An ACR application typically requires the caller to speak one of a finite set of answers in response to automated questions. The ACR application then attempts to route the caller to an appropriate agent or destination for servicing the caller's request.

ACR systems, however, may not accurately route calls to the proper customer service representatives if the speech recognition system partially understands or misunderstands the caller's intent. Additionally, callers typically prefer to speak directly with a human customer service representative when initiating a call with a call center instead of with an ACR application. As discussed above, even if the caller engages a customer service representative, that particular customer service representative may not have the proper training or skills to adequately address the caller's issue.

FIGURES

Various embodiments of the present invention are described herein by way of example in conjunction with the following figures, wherein.

DESCRIPTION

Figure 1:
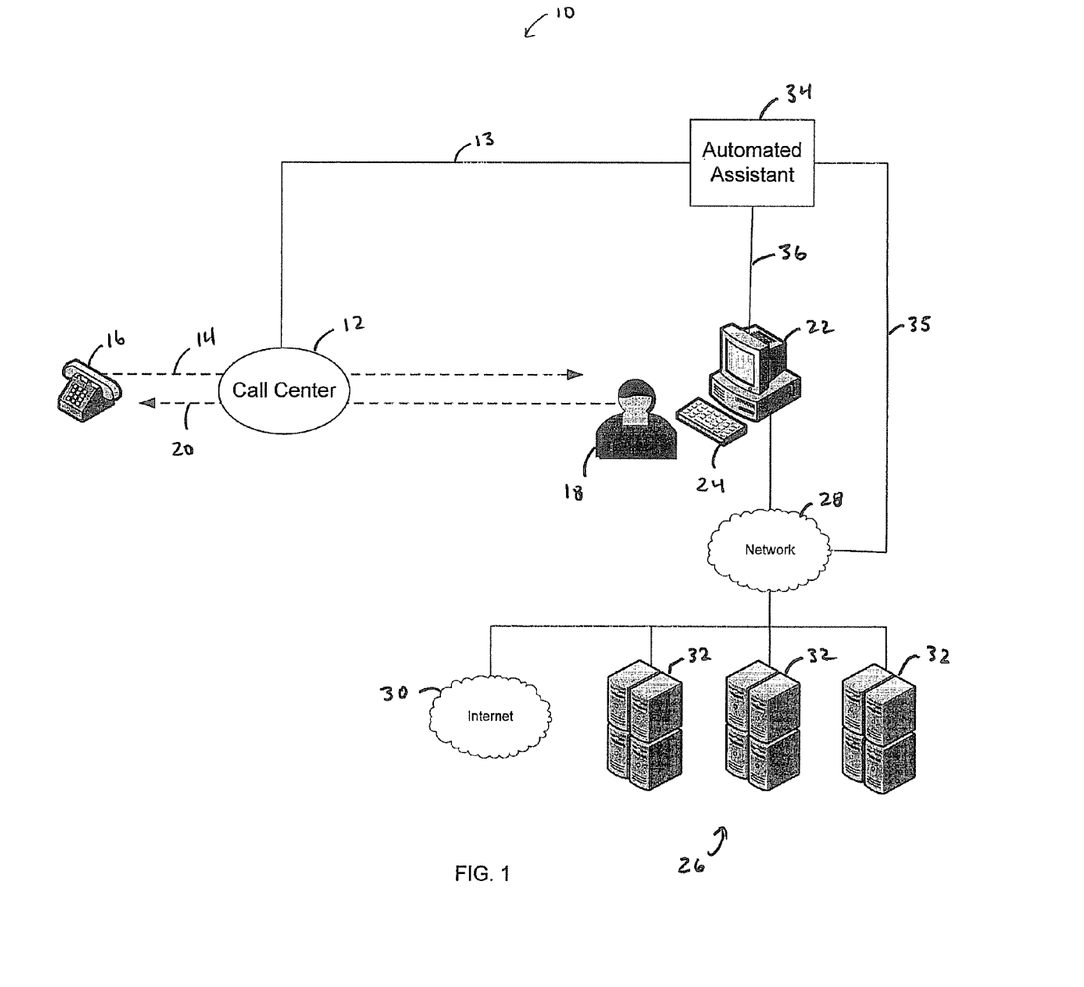
FIG. 1 is a system view of a call center and voice recognition system in accordance with various embodiments of the present invention.

FIG. 1 illustrates an embodiment of a communications system 10 according to various embodiments of the present invention. As shown, the communications system 10 may comprise a call center 12. The call center 12 may receive a call 14 from a caller 16 and route the call 14 to an agent, such as a customer service representative 18, associated with the call center 12. As may be readily understood by one skilled in the art, the call center 12 may receive a plurality of incoming calls 14 from a plurality of callers 16. Furthermore, the call center 12 may be comprised of a network of multiple call centers with call centers 12 located in different geographic locations. The calls 14 to the call center 12 may be placed over a conventional public telephone network (e.g., POTS) or over a Voice Over Internet Protocol ("VOIP") network. The call center 12 may have a plurality of customer service representatives 18 telephonically connected. Thus, while only a single customer service representative 18 is illustrated in FIG. 1, it should be understood that a plurality of different customer service representatives may be associated with the call center 12. As readily understood, the customer service representative may have a conversation with the caller 16 through a series of outgoing utterances 20.

Still referring to FIG. 1, the customer service representative 18 may interact with a user interface or workstation, such as a terminal 22. The terminal 22 may be, for example, a personal computer ("PC"), a laptop, or any other suitable computer-based device. The terminal 22 may have an input device 24, such as a keyboard and/or mouse. In various embodiments, the customer service representative 18 may type information learned from the caller during the call 14 into the terminal 22 to obtain relevant information about the caller, etc. In other embodiments, the input device may be a touchscreen, for example. It is appreciated that a single customer service representative may interact with multiple terminals 22, although only one is illustrated.

In various embodiments, the terminal 22 may be connected to a computing system 26 through a data communication network 28. The network 28 may comprise a local area network ("LAN") or any other suitable computer network (such as the Internet or an intranet) utilizing wired and/or wireless communication links. It is appreciated that in some embodiments, the terminal 22 may be connected directly to computing devices of the computing system 26, such as by a universal serial bus connection ("USB"). In other embodiments, the terminal 22 and the computing system 26 may be an integral computing device. The terminal 22 may also be connected to the Internet 30 through a suitable network connection. In some embodiments, the computing system may comprise one or more computer servers 32.

Still referring to FIG. 1, computing system 26 may store information related to (i) the goods and services supported by the call center 12 and (ii) account information. For example, computing system 26 may store information related to account information, billing information, address information, repair information, schedules, pricing information, employee information, travel information, technical support information, store/office locations, or any other information. The information in computing system 26 may be accessible to the customer service representative 18 via network 28 and may be stored in one or more computer databases of the computing system 26. The storage structure of the databases may be memory units (e.g., ROM) of the servers 32 or mass storage devices, such as hard disk drives, etc. The servers 32 may be, for example, database servers.

The terminal 22 and computing system 26 may include operatively associated computer-readable media such as memory (e.g., ROM or RAM) for storing software applications used in obtaining, processing, storing, and/or communicating data. It can be appreciated that such memory can be internal, external, remote, or local with respect to its operatively associated computer or computer system. Memory may also include any means for storing software or other instructions including, for example and without limitation, a hard disk, optical disk, floppy disk, DVD, compact disc, memory stick, ROM (read only memory), RAM (random access memory), PROM (programmable ROM), EEPROM (extended erasable PROM), and/or other like computer-readable media.

Still referring to FIG. 1, the communications system 10 may include an computer-based automated assistant 34. The automated assistant 34 may be a separate computer-based device (as shown) or it may be integrated with any part of the communications system 10, such as the call center 12, the terminal 22, and/or the computing system 26, or it may reside on a separate dedicated server, computer, or device, for example. In some embodiments, various components of the automated assistant 34 may reside in different places. The automated assistant may be connected to the call center via communication link 13.

The automated assistant 34 may be configured to deliver information to the customer service representative 18 based on speech utterances from the caller 16 or the call 14 that are detected and analyzed by the automated assistant 34. In the illustrated embodiment, the automated assistant 34 delivers information to the terminal 22 via communication link 36. It is appreciated that any suitable technique may be used to connect the automated assistant 34 to the terminal 22, including but not limited to a wireless network, a local area network, an intranet, or the internet. As discussed in more detail below, the automated assistant 34 may process the speech utterances of the incoming call 14 to determine its contents. Based on the content of the incoming call 14, the automated assistant 34 may deliver information to the customer service representative 18 that may be helpful in handling the caller's call. In various embodiments, the automated assistant 34 may be in communication with the computing system 26 via a communication link 35. It is appreciated that any suitable connection may be used, such as a wireless network, a local area network, an intranet, or the internet.

Referring now to FIGS. 2A-2D, sample screen shots of terminal 22 are illustrated. The terminal 22 may have a screen 38 used to display information to the customer service representative 18. The screen may display various windows or fields, such as field 40. In other embodiments, different display configurations may be used. Field 40 may display information about the caller 16 or other information that the customer service representative 18 can convey to the caller. For example, field 40 may display account information, product/service information, billing information, or any other information that may be useful to the customer service representative 18. While speaking to the caller 16, the customer service representative 18 may use the input device 24 (FIG. 1) to access the various information, such as the information stored in the computing system 26. For example, if the caller 16 inquires about a bill or an invoice, the customer service representative 18 can access the caller's billing information stored in the computing system 26 and convey the information presented on the terminal 22 verbally to the caller 16.

Figure 2A:
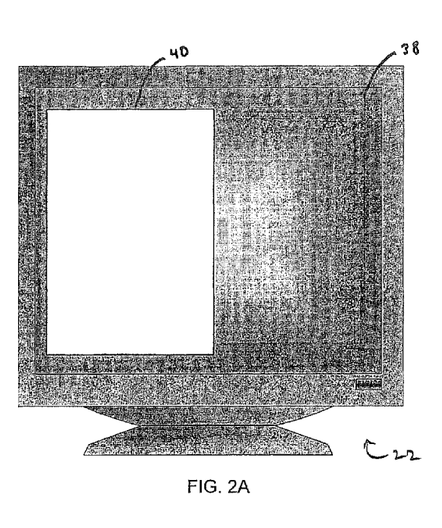
FIGS. 2A-2D are displays in accordance with various embodiments of the present invention.
Figure 2B:
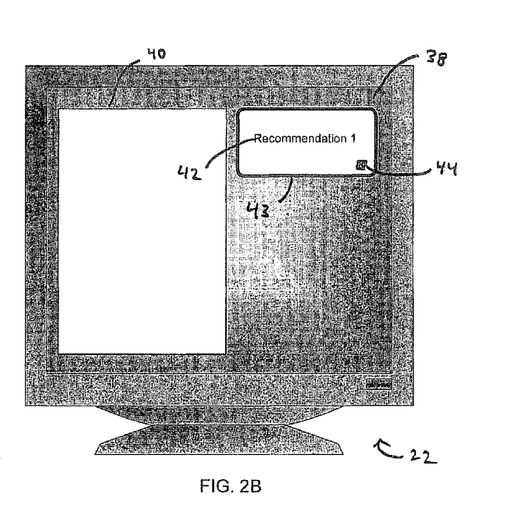

While the call is transpiring, the automated assistant 34 may be concurrently deciphering the utterances of the call 14 in "real time." After determining the contents of the caller's inquiry or request (according to a threshold confidence level), the automated assistant 34 may display a first recommendation 42 on the terminal 22. It is appreciated that the first recommendation 42 may be displayed using any suitable technique. For example, the first recommendation 42 may be a "pop-up" window (as shown in FIG. 2B), or it may be presented as a text or an image in field 40. If multiple terminals 22 are utilized by the customer service representative 18, the first recommendation 42 may appear on any number of terminals using any number of techniques.

The first recommendation 42 displayed in a recommendation window 43 may provide information that is useful or helpful to the customer service representative 18 in handling the call from the caller 16. For example, if the automated assistant 34 determines the caller 16 is inquiring about an account balance, the first recommendation 42 may provide the caller's account balance. In other examples, the first recommendation may include a link, such as a hyperlink, to access a table or database containing the caller's account information. To retrieve the information conveyed by the first recommendation 42, the automated assistant may communicate with the computing system 26. If the information displayed to the customer service representative 18 is useful or relevant, the customer service representative 18 may utilize the information during the call. In some instances the information conveyed by the first recommendation 42 may not be helpful to the customer service representative 18. For example, the automated assistant 34 may have misinterpreted the caller's inquiry or otherwise provided unhelpful information. If the first recommendation 42 is not deemed relevant by the customer service representative 18, it can simply be ignored. Furthermore, if the customer service representative 18 has a high level of training or competence with the system, the recommendation 42 may be ignored or disregarded.

Figure 2C:
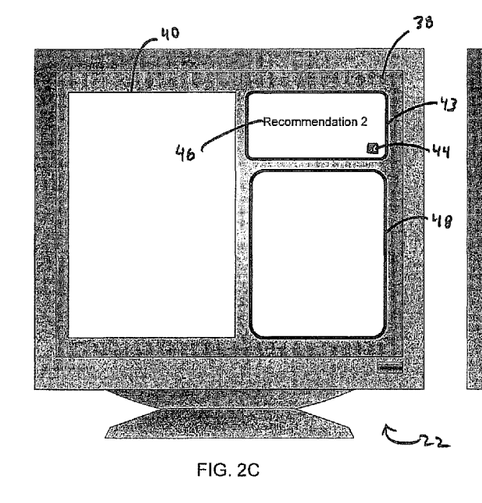

As shown in FIG. 2C, the automated assistant 34 may display multiple recommendations, such as a second recommendation 46 in the recommendation window 43, in response to a second concept spoken by the caller 16 and analyzed by the automated assistant 34. In some embodiments, a field 48 may be displayed by the terminal 22 in response to data from the automated assistant 34. The field 48 may be populated with text, graphics, or information potentially relevant to the caller 16 based on the call 14. For example, if the caller 14 inquiries about a technical support issue, the second recommendation 46 may include suggested techniques to address the technical issue conveyed. The field 48 may be populated with other useful information, such as wiring diagrams or architecture diagrams. As readily appreciated by one skilled in the art, the automated assistant 34 may be used with any type of call center 12 regarding any type of goods or services. The automated assistant 34 is not limited to any particular type of call center 12, terminal 22, or computing system 26.

In some embodiments, the recommendations provided by the automated assistant 34 may remain displayed on the terminal for a certain period of time. After the period of time has expired, the recommendation may disappear from the screen. In some implementations, a log or file of previous recommendations may be maintained, stored in a memory medium associated with system 26 (FIG. 1), for example. Therefore, the customer service representative 18 could have the option to access recommendations made in the past by the automated assistant 34. In various embodiments, the recommendation window 43 may be "closed" or "exited." For example, the recommendation window 43 may include an icon 44 which can be activated by the customer service representative 18 to close or exit the window.

Figure 2D:
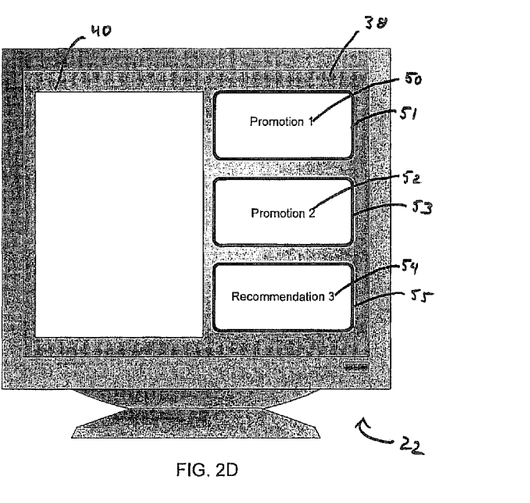

The automated assistant 34 may also provide recommendations or suggestions to the customer service representative 18 about information not specifically requested by the caller 16. Referring to FIG. 2D, the automated assistant 34 may determine, for example, the demographical information about caller 16 based on caller ID for the call 14 or information stored about the caller 16 in the computing system 26 or elsewhere. Using that information, the automated assistant 34 may display information to the customer service representative 18, such as a first promotion 50 in a promotion window 51 and a second promotion 52 in a promotion window 53. The information displayed could be any information potentially relevant to the caller, including, for example, marketing or promotional material. The customer service representative 18 could then convey this information to the caller. It is noted that while displaying the promotional information, the automated assistant 34 may be continually interpreting the utterances of the call 14 in order to display any recommendations, such as a recommendation 54 in recommendation window 55.

It is appreciated that the display of the information based on the caller's utterances can be displayed in any suitable technique. The displaying of the recommendations and the type of information conveyed is not limited to any particular type or format. For example, the recommendations, promotions, and/or other information may be displayed in a series of windows, in a single window, as a tabbed windows, as a log, in a list, as hyperlinks, as a URL, as text, as graphics, as images, on a separate screen, on a pop-up window, or any combination thereof.

Figure 3:
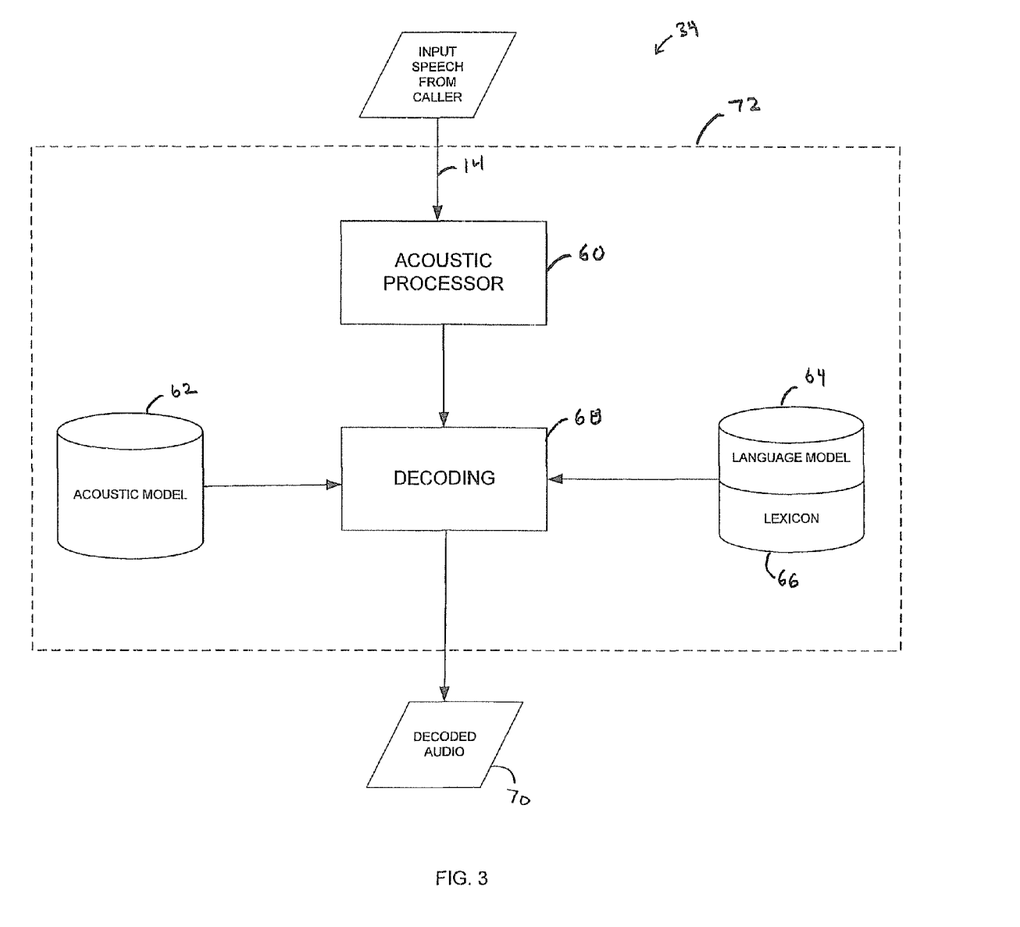
FIG. 3 is a block diagram of a computer-based automated assistant in accordance with one non-limiting embodiment.
Figure 4:
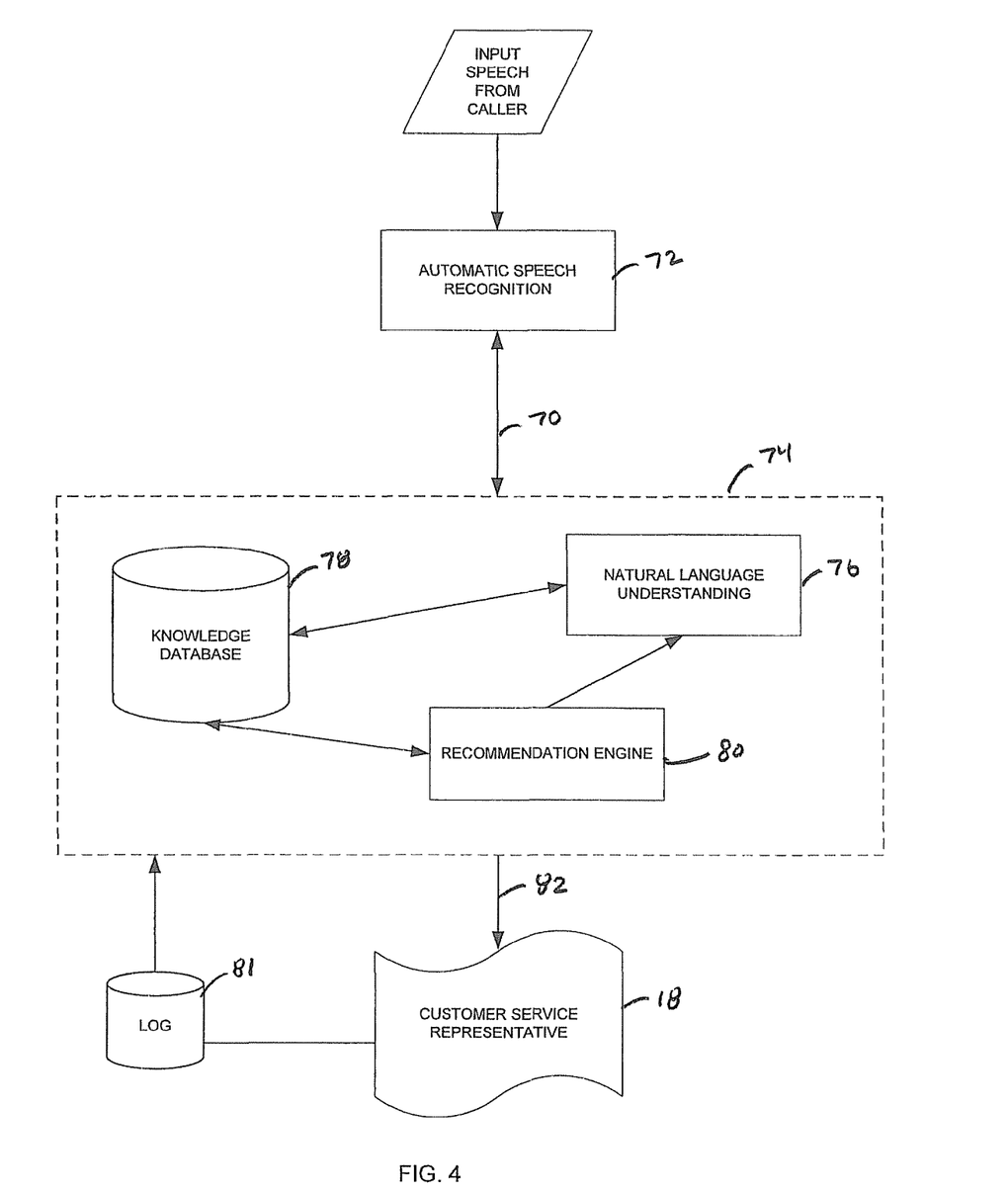
FIG. 4 is a block diagram of a customer service representative recommendation system in accordance with one non-limiting embodiment.

Referring now to FIG. 3, the computer-based automated assistant 34 may comprise a speech processor 72 and a back-end computer-based customer service representative recommendation system 74 (FIG. 4). In various embodiments, as shown in FIG. 3, the speech processor 72 may comprise an acoustic processor 60, an acoustic model 62, a language model 64, a lexicon 66, and a decoder 68. The speech processor 72 may receive the incoming call 14 and convert the caller's utterances in the call into a string of one or more words based on the configuration of the models in the system. The speech processor 72 may then provide a decoded audio string 70 as output. In various embodiments, the string of words may additionally be accompanied by a score or rating that indicates the speech processor's level of confidence with the voice recognition. For example, the score or rating may be an indication of the level of confidence in either the individual words and/or the entire recognized string. Optionally, the speech processor 72 may output a list of possible matches to the utterances. For example, the speech processor 72 may output the top three, five, or thirty matches. It may be understood that any number of possible matches could be provided by the speech processor 72. In various embodiments, the speech processor 72 may output or otherwise store or log a recognition lattice. The recognition lattice may represent the speech processor's 72 internal representation of the decoded utterance and what the speech processor 72 uses to derive the best output, or plurality of possible outputs.

Referring now to FIG. 4, the customer service representative recommendation system 74 may process the decoded audio string 70 from the speech processor 72. The customer service representative recommendation system 74 may comprise various computer-based components, including a language understanding software module 76, a knowledge database 78, and a recommendation engine 80. The customer service representative recommendation system 74 may be a computing device that executes the modules that are stored in a memory device. The language understanding module 76 may be configured to accept a textual representation of the spoken utterances, such as the decoded audio string 70, and extract the meaningful concepts or content. In various embodiments, the language understanding module 76 may also accept a score or rating which indicates a level of confidence. Additionally, in some implementations, the language understanding module 76 may accept a plurality of possible matches to the utterances in the call 14 (FIG. 1).

The language understanding module 76 may extract meaningful concepts or content from a textual representation of the call 14 using any number of a variety of techniques from the field of natural language understanding. In various embodiments, the speech processor may utilize a regular expression parser such as described in U.S. Pat. No. 7,565,368 to Zartler, et al., the entirety of which is incorporated by reference. As may be appreciated by those skilled in the art, there are various systems capable of implementing the natural language understanding component. In various embodiments, a concept may be considered to be a composition of one or more ideas that are pertinent to the application domain. These critical ideas may be expressed in the textual representation via patterns of one or more "vocabs," "helper terms," "building blocks," and/or other forms of expression. The assignment of the vocabs, helper terms, building blocks, and/or other forms of expression to various concepts may be created by a human or may be generated automatically using any of a variety of standard (unsupervised or supervised) machine learning techniques. As appreciated by those skilled in the art, the process of extracting concepts from a textual representation may not be exact and, therefore, a matching score to each of the one or more possible matching concepts in the textual representation may be assigned. These one or more possible matching concepts and their associated scores may then be passed on to the recommendation engine 80. In various embodiments, the one or more possible matching concepts may be archived, such as by a database or other storage medium, for later analysis and review by a human or machine in order to further improve the performance of the system.

The recommendation engine 80 may match the concepts of the decoded audio string 70 to "responses" contained in the knowledge database 78. The system 74 may then output a response 82 to the customer service representative 18. As discussed above, the response 82 may be a recommendation, promotional materials, or other information that may be helpful to the customer service representative 18 during a call with a customer. In various embodiments, the recommendation engine 80 may use concept-response mapping. In some implementations, the concept-response mapping may be generated either automatically or by a human during the development of the application 74.

The automated assistant 34 may also use information from the outcome of past recommendations to influence its choice of which recommendations to present to the customer service representative 18. For example, the automated assistant may create a log 81 for tracking the customer service representative's use of the responses 18. From the log 81, the usefulness or appropriateness of the response 18 may be metered. In various embodiments, the knowledge database 78 may utilize the data in the log 81. Based on that data, future recommendations by the automated assistant 34 may be altered or modified to increase the usefulness of the system.

Figure 5:
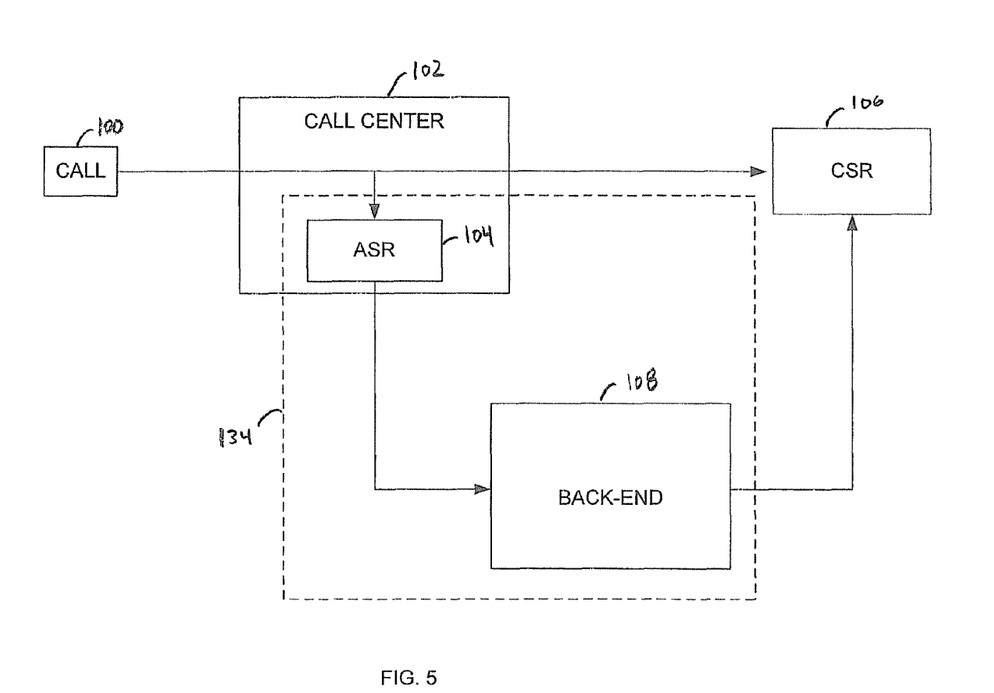
FIG. 5 illustrates a computer-based automated assistant in accordance with one non-limiting embodiment.

FIG. 5 illustrates a sample embodiment of an automated assistant 134. The automated assistant 134 may be a computing device comprising an automatic speech recognition system 104 and a back-end customer service representative recommendation system 108. As shown, a call 100 with incoming utterances comes into a call center 102. The automatic speech recognition system 104 processes the incoming utterances from the call 100. Concurrently, the call 100 is also routed to a customer service representative 106 who may verbally interact with the caller 100. The automatic speech recognition system 104 may process or decode the audio and deliver the decoded audio to a back-end customer service representative recommendation system 108. The application back-end may then interpret the content or meaning of the call. Once the content is determined, data may be gathered from associated databases and memory devices, such as that stored in computing system 26 (FIG. 1), relevant to the content. The automated assistant 134 may then deliver information to the customer service representative 106 based on the data gathered.

According to one embodiment, the present invention is directed to a method that comprises the steps of receiving by a call center a call from a caller, the call comprising utterances from the caller, and routing the call to a customer service representative of the call center, where the customer service representative interacts with a computer device comprising a display. The method further comprises the step of processing the utterances with an automated assistant computing device to recognize speech in the utterances, where the automated assistant computing device is in communication with the computer device of the customer service representative and determining by the automated assistant computing device content of the utterances. The method further comprises displaying information on the display of the computer device of the customer service representative based on the content determined by the automated assistant computing device.

According to various implementations, the information is a recommendation to the customer service representative. Also, a plurality of recommendations may be displayed on the display. In one embodiment, the information is promotional information. In one embodiment, the method further comprises verbally communicating the information on the display by to the customer service representative to the caller during the call. In one embodiment, the automated assistant comprises an automatic speech recognition component. In one embodiment, the automatic speech recognition component comprises an acoustic processor, an acoustic model, and language model. In one embodiment, the method further comprises delivering decoded audio from the speech recognition component to an application comprising a knowledge database, a recommendation engine, and a language understanding component. In one embodiment, the information is displayed in a graphical window on the display. In one embodiment, the information comprises a link. In one embodiment, the method comprises removing the information from the display after an expiration of a time period.

According to another embodiment, the present invention is directed to a system that comprises a call center configured to receive a call from a caller and telephonically connect a customer service representative to the caller, where the call comprises utterances. The system further comprises a computer device comprising a display, where the display displays information to the customer service representative, where the computer device comprises at least one processor and at least one computer memory device for storing instructions to be executed by the at least one processor. The system further comprises an automated assistant computing device in communication with the customer service representative computer device, where the automated assistant is programmed to process the utterances and recognize speech in the utterances, determine content of the utterances, and display information on the display of the customer service representative computer device based on the determined content.

In one embodiment, the automated assistant computing device comprises a voice recognition system configured to process the utterances. In one embodiment, the information comprises a recommendation. In one embodiment, the information comprises promotional information. In one embodiment, the system further comprises a database configured to store a log that accumulates data regarding the information displayed.

According to one embodiment, a call center system comprises a customer service representative computer device and a computer system comprising a voice recognition system, where the voice recognition system is configured to determine the contents of a call to the call center and provide a recommendation to the customer service representative computer device. In one embodiment, the voice recognition system is configured to provide promotional information to the customer service representative computer device. In one embodiment, the customer service representative computer device comprises a display configured to display the recommendation. In one embodiment, the system further comprises a database configured to store a log that accumulates data regarding the recommendation displayed.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers, or other processor-based devices. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language or platform such as .NET, SQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, to transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN), metropolitan area network (MAN), wide area network (WAN), virtual private network (VPN), storage area network (SAN), or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A method, comprising:
receiving by a call center a call from a caller, the call comprising utterances from the caller;
routing the call to a customer service representative of the call center, wherein the customer service representative interacts with a computer device during the call, wherein the computer device comprises a display;
processing the utterances with an automated assistant computing device to recognize speech in the utterances, wherein the automated assistant computing device is in communication with the computer device of the customer service representative;
assigning a first score that indicates a degree of accuracy associated with the recognized speech in the utterances;
determining, by the automated assistant computing device, a concept of the utterances based at least in part on the assigned first score;
assigning a second score that indicates a degree of accuracy associated with the determined concept to the recognized speech;
matching the determined concept to information in a knowledge database based at least in part on a predetermined mapping between one or more concepts and one or more informational entities; and
displaying the information from the knowledge database on the display of the computer device of the customer service representative based at least in part on the matching and the assigned second score.

2. The method of claim 1, wherein the information is a recommendation to the customer service representative.

3. The method of claim 2, further comprising:
displaying a plurality of recommendations on the display.

4. The method of claim 1, wherein the information is promotional information.

5. The method of claim 1, further comprising:
verbally communicating the information on the display of the customer service representative to the caller during the call.

6. The method of claim 1, wherein the automated assistant comprises an automatic speech recognition component.

7. The method of claim 6, wherein the automatic speech recognition component comprises an acoustic processor, an acoustic model, and language model.

8. The method of claim 7, further comprising:
delivering decoded audio from the speech recognition component to an application comprising a knowledge database, a recommendation engine, and a language understanding component.

9. The method of claim 1, wherein the information comprises a link.

10. The method of claim 1, further comprising:
removing the information from the display after an expiration of a time period.

11. A system, comprising:
 a call center configured to receive a call from a caller and telephonically connect a customer service representative to the caller, wherein the call comprises utterances;
 a computer device comprising a display that displays information to the customer service representative, wherein the computer device comprises at least one processor and at least one computer memory device for storing instructions to be executed by the at least one processor; and
 an automated assistant computing device in communication with the customer service representative computer device, wherein the automated assistant is programmed to:
  process the utterances and recognize speech in the utterances;
  convert the recognized speech in the utterances into a string of one or more words;
  assign a score that indicates a degree of accuracy associated with the converted string of one or more words with the recognized speech;
  determine a first concept associated with the string of one or more words converted from the recognized speech in the utterances based at least in part on the string of one or more words and the assigned score; and
  transmit information to the customer service representative computer device based on the determined first concept and the assigned score so that the information is displayed on the customer service representative computer device.

12. The system of claim 11, wherein the automated assistant computing device comprises a voice recognition system configured to process the utterances.

13. The system of claim 12, wherein the information comprises a recommendation.

14. The system of claim 12, further comprising a database configured to store a log that accumulates data regarding the information displayed.

15. A call center system, comprising:
 a customer service representative computer device; and
 a computer system comprising a voice recognition system, wherein the voice recognition system is configured to:
  process one or more utterances to recognize speech in the one or more utterances;
  assign a first score that indicates a degree of accuracy associated with the recognized speech in the one or more utterances;
  determine a concept of one or more utterances based at least in part on the recognized speech and the first score;
  assign a second score that indicates a degree of accuracy associated with the determined concept; and
  provide a recommendation to the customer service representative computer device based on the determined concept and the assigned second score.

16. The call center system of claim 15, wherein the voice recognition system is configured to provide promotional information to the customer service representative computer device.

17. The call center system of claim 15, wherein the customer service representative computer device comprises a display configured to display the recommendation.

18. The call center system of claim 15, further comprising a database configured to store a log that accumulates the recommendation provided to the customer service representative, wherein:
 the log is available for human analysis, wherein the human analysis includes analyzing the recommendation for usefulness to the caller after the recommendation is provided to the caller; and
 the voice recognition system is further configured to determine a concept of a subsequent call based on the human analysis of the log.

19. The system of claim 11, wherein the automated assistant is further programmed to:
 determine a second concept associated with the string of one or more words converted from the recognized speech in the utterances; and
 generate an additional recommendation based at least in part on the determined second concept.

20. The method of claim 1, wherein the predetermined mapping is generated automatically or by a human.

21. The method of claim 1, wherein the displaying the information is further based at least in part on the assigned score.

* * * * *